July 8, 1941.   W. A. MONAGHAN   2,248,888
REPAIR AND TESTING DEVICE FOR PLY MATERIALS
Filed July 19, 1939

Inventor
William A. Monaghan
By Munn, Anderson & Liddy
Attorney

Patented July 8, 1941

2,248,888

UNITED STATES PATENT OFFICE 2,248,888

REPAIR AND TESTING DEVICE FOR PLY MATERIALS

William A. Monaghan, Wildwood, N. J.

Application July 19, 1939, Serial No. 285,451

2 Claims. (Cl. 81—15.6)

This invention relates to an injecting device for testing fabricated material.

An object of the invention is the provision of a device which is adapted to be used as a testing device for determining whether there is a separation between the plies of an automobile tire by injecting a fluid through a sharp pointed nozzle as it is being forced transversely through the plies.

Another object of the invention is the provision of a device for detecting the separation of plies in a tire by injecting fluids from a penetrating nozzle as the nozzle is being forced through the thickness of the wall of the tire, the injected fluid causing expansion of the plies of the tire where there is a separation, while the pressure device which is employed for creating a pressure is being retained against movement as long as perforations in the penetrating nozzle are sealed by the secured plies, the fluid being released when the penetrating nozzle coincides with a separation in the plies so that the release of pressure will be indicated on the pressure creating device.

A further object of the invention is the provision of a device for detecting separated plies in automobile tires by means of a fluid under pressure which will expand the separated plies, the device also being used for injecting sealing material such as solvents or a rubber solution between the separated plies for connecting the plies together, the tester also being employed for removing excess solutions or other materials from the space between the separated plies.

This invention will be best understood from a consideration of the following detailed description, in view of the accompanying drawing forming a part of the specification; nevertheless, it is to be understood that the invention is not confined to the disclosure, being susceptible of such changes and modifications as define no material departure from the salient features of the invention as expressed in the appended claims.

In the drawing:

Figure 2 is a longitudinal section taken on the line 2—2 of Figure 1.

Figure 1:
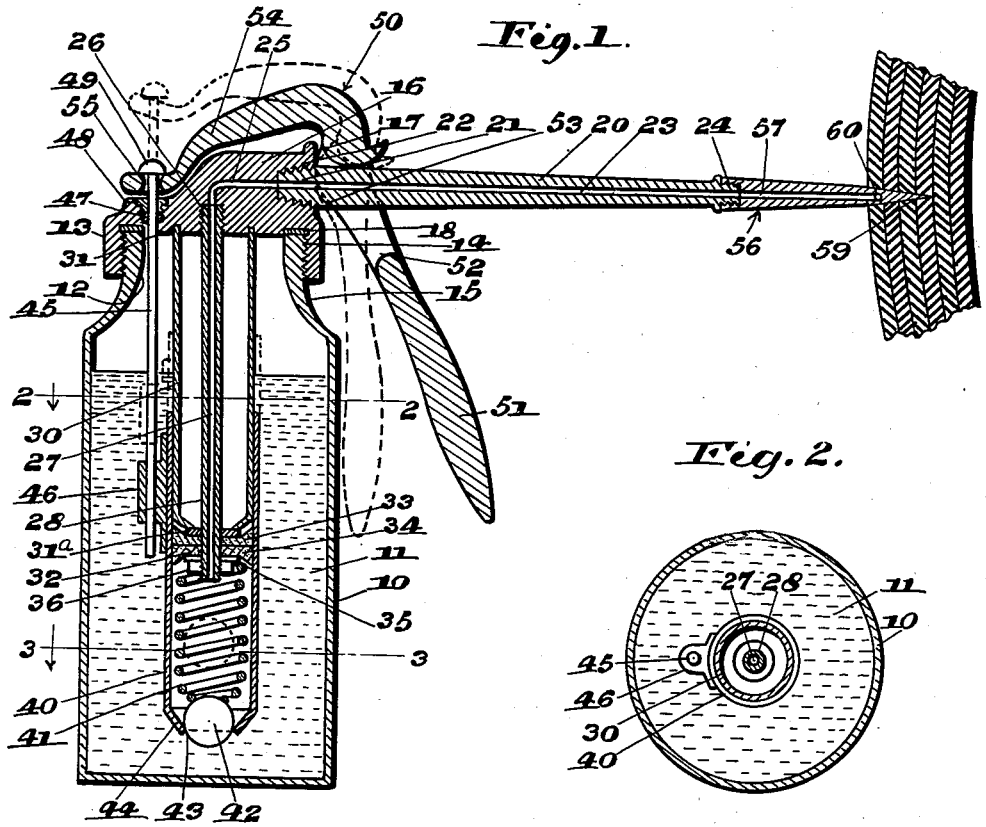
Figure 1 is a vertical section of a combined tester and injector constructed in accordance with the principles of my invention.
Figure 3:
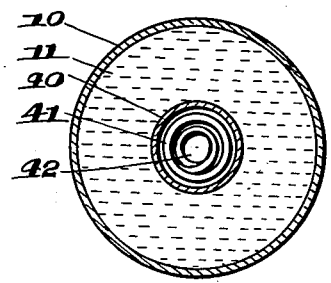
Figure 3 is a longitudinal section taken on the line 3—3 of Figure 1.
Figure 4:
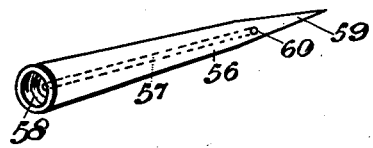
Figure 4 is a view in perspective of a penetrating nozzle which is removably connected to the tester shown in Figure 1.

Referring more particularly to the drawing 10 designates a container which is adapted to be filled or partially filled with a fluid as shown at 11. The upper end of the container is provided with an opening 12 closed by a cap 13 which is screwed upon the external threads 14 of the reduced upper end 15 of the container. However, the container may have the same diameter throughout.

The cap or cover 13 is provided with an upstanding enlargement 16 having one end as shown at 17 provided with a vertical face for a purpose which will be presently explained. A gasket 18 is located between the upper end of the container 10 and the inner face of the cap 13.

A stem or pipe 20 has a reduced end, as shown at 21, which is screwed into the an internally threaded pocket 22 formed in the enlargement 16 of the cap 13 with the outer end of the pocket being located in the flat face 17 of the enlargement 16. This stem is provided with a longitudinal axial passage 23 which extends from its outer reduced threaded end 24 through the inner end 21.

A passage 25 extends laterally through the enlargement 16 and has its outer end in communication with the passage 23. The inner end of the passage 25 terminates at an internally threaded pocket 26 in the cap 13 so that the passages 23 and 25 will be in communication with an axial passage 27 in a pipe 28 which has its upper end threaded into the pocket 26.

A tube 30 has its upper end, as shown at 31, secured to the inner face of the cap or cover 13 and this tube has its longitudinal axis in alinement with the longitudinal axis of the pipe 28. The lower end of the tube 30 is closed and the pipe 28 extends through the lower closed end 31a of the tube 30. Below the closed end 31a the tube 30 is provided with a piston generally designated by the numeral 32 and this piston is formed of a pair of opposed cups 33 and 34 which are held on to the lower threaded end of the pipe 28 by means of a washer 35 and a nut 36.

A cylinder 40 is slidably mounted on the outer face of the tube 30 and is urged outwardly from said tube by means of a spring 41 which is in engagement at one end with the piston 32, while the other end presses upon a ball valve 42 which normally closes a port 43 formed at the lower reduced end 44 of the cylinder 40. The said cylinder is adapted to be moved upwardly against the tension of the spring 41 for reducing the space between the piston 32 and the lower end 44 of the cylinder 40 for placing fluid in the cylinder under pressure and forcing it through the pipe 28 and the passage 23 in the stem 20.

A rod 45 is secured at its lower end within a projection 46 formed on the side wall of the cylinder 40. This rod extends upwardly through a passage in the cap 13 through a packing 47 and a gland 48 threaded into a pocket in the cap 13 at one side of the enlargement 16. The outer end of the rod is provided with a head 49.

An angularly shaped lever generally indicated by the numeral 50 has an operating handle 51 projecting downwardly and outwardly from the side walls of the container 10. The handle is provided with an elongated opening 52 which is adapted to be received by the stem 20 so that the handle at this point straddles said stem. The lever is provided with a projection or fulcrum 53 which is adapted to engage the flat face 17 of the enlargement 16 of the cap. The lever includes a downwardly turned arm 54 which is provided with an opening 55 to receive the rod 45. The head 49 of the rod rests upon the upper face of the flattened section of the downturned portion of the lever 50. It will be noted that the passage 55 is of greater length than the diameter of the rod 45 so that the lever 50 may be properly operated without placing any strain on the upper end of the rod 45.

A nozzle 56 has a longitudinal passage 57 alining with the passage 23 in the stem 20. The inner end of the nozzle has an internally threaded pocket 58 which is screwed on to the reduced threaded end 24 of the stem 20. The extreme outer end of the nozzle is pointed as shown at 59 and inwardly of this point is provided a plurality of perforations 60 which connect the passage 57 with the exterior of the nozzle.

The operation of my device is as follows:

Any suitable fluid may be placed in the container 10 such as a solvent, a rubber solution or a chemical solution which when injected between the plies of a tire will cement the plies together after they have been separated by the fluid. After the parts are in the position shown in Figure 1, the penetrating point 59 which has a reduced diameter is forced into the wall of an automobile tire casing and after the perforations 60 disappear beneath the outer surface of the tire the handle 51 is moved towards the container 10 to the position shown in dotted lines in Figure 1.

When the handle 51 is moved towards the container 10 the lever 50 through the down-turned portion will raise the rod 45 upwardly against the tension of the spring 41 and since the piston 32 is stationary the cylinder 40 will be moved upwardly with the spring 41 pressing against the ball valve 42 and maintaining said valve closed while placing the liquid in the cylinder under pressure. The fluid pressure will be extended through the pipe 28, stem 20 and the nozzle 56. As long as the perforations 60 are closed the pressure will be maintained equally throughout the connected parts.

When the perforations 60 pass any voids or separations between the plies of the automobile casing the pressure will be released and the fluid will pass between the plies and expand the same and this release of pressure will be indicated by the handle 51 so that the operator of the tester can determine immediately if the perforations 60 are in alinement with the voids in the casing. In this manner the device is not only used as a tester to determine where separations occur in the casing, but the fluid in the container may be a cement of a suitable type for application to the separated surfaces in the casing so that these separated parts will be cemented together.

When the handle 51 is operated the fingers of the operator may be extended around the casing 10 and the palm of the hand will rest on the handle 51 and as the handle is moved to the dotted line position the fulcrum acting on the flat face 17 of the enlargement 16 will cause the end of the lever connected with the end of the rod 45 to be elevated.

When the lever 50 is released the spring 41 will move the cylinder 40 downwardly. Towards the end of the stroke the fluid will flow past the valve 42 into the cylinder 40 for further application.

As has been stated the device is not only adapted to be used as a tester, but it may be employed to remove foreign matter, air and voids created by separated plies in a casing. The device may also be used for injecting a suitable solvent which will cause the separated plies to cement when the tester has been removed. The device may inject cementing materials into the voids between the separated plies during the testing operation so that when the nozzle is withdrawn and when the cement is allowed to harden the plies will be secured together. The nozzle 56 is removably connected to the outer end of the stem 20 and the penetrating point has an extremely reduced diameter so that it will not in any way injure the casing.

I claim:

1. A device for detecting separation of rubber and plies in a tire comprising a container housing a fluid, a cap sealing the top of the container, a rod slidably mounted in the container and projecting through the cap, a movable cylinder connected to the inner end of the rod, a piston fixed to the cap and projecting into the cylinder, said cylinder having a port communicating with the container, a valve closing the port, a spring between the piston and valve, means causing reciprocation of the rod and cylinder with respect to the piston, a hollow stem projecting from the cap, means placing the stem in communication with the cylinder, and a penetrating nozzle on the free end of the stem having discharge openings near the outer end of said nozzle.

2. A device for detecting voids and separated plies in an automobile tire comprising a container housing a fluid, a cap sealing the top of the container, means for creating a pressure on the fluid within the container, a rod connected with the pressure creating means and projecting from the container, a lever having connections with the projecting end of the rod, a handle projecting at an angle from the lever and provided with a projection engaging the cap on the container, a hollow stem projecting from the cap and in communication with the interior of the container, the handle having an elongated slot receiving the stem, a curved shoulder at one end of the slot rockably mounted on the hollow stem and co-operating with the projection and the cap to act as a fulcrum for operating the lever and a hollow nozzle secured to the free end of the stem and provided with a sharp point for penetrating transversely the walls of a tire, said nozzle having discharge openings located adjacent the penetrating point.

WILLIAM A. MONAGHAN.